United States Patent [19]
Bellec et al.

[11] Patent Number: 5,058,436
[45] Date of Patent: Oct. 22, 1991

[54] STRAIN-CONCENTRATING, MEMBRANE-TYPE TRANSDUCER

[75] Inventors: Gérard Bellec, St-Medard-en-Jalles; René Goutti, Le Taillan Medoc, both of France

[73] Assignee: Societe Europeenne de Propulsion, Suresnes, France

[21] Appl. No.: 541,277

[22] Filed: Jun. 20, 1990

[30] Foreign Application Priority Data

Jun. 21, 1989 [FR] France .................. 89 08292

[51] Int. Cl.$^5$ .................... G01L 7/08; G01L 9/06
[52] U.S. Cl. ........................................ 73/727; 338/4
[58] Field of Search ............. 73/727, 726, 721, 720; 338/4, 42

[56] References Cited

U.S. PATENT DOCUMENTS

| | | | |
|---|---|---|---|
| 2,979,680 | 4/1961 | Bean, Jr. | 73/720 |
| 3,035,240 | 5/1962 | Starr | 338/42 |
| 3,168,718 | 2/1965 | Swartz et al. | 338/42 |
| 3,520,191 | 7/1970 | Pien | 73/726 |
| 4,299,129 | 11/1981 | Ritzinger | 73/720 |

FOREIGN PATENT DOCUMENTS

| | | |
|---|---|---|
| 1252439 | 4/1968 | Fed. Rep. of Germany . |
| 2263901 | 10/1974 | Fed. Rep. of Germany . |
| 2608381 | 8/1977 | Fed. Rep. of Germany . |
| 2587485 | 3/1987 | France . |
| 2594224 | 8/1987 | France . |
| 2594546 | 8/1987 | France . |
| 211174 | 7/1984 | German Democratic Rep. . |
| 1155286 | 6/1969 | United Kingdom . |
| 1417020 | 12/1975 | United Kingdom . |

*Primary Examiner*—Donald O. Woodiel
*Attorney, Agent, or Firm*—Weingarten, Schurgin, Gagnebin & Hayes

[57] ABSTRACT

The transducer comprises a membrane that is deformable under the effect of a magnitude to be measured, a beam joined to the membrane to detect stresses transmitted by the membrane, and strain gauges affixed to the beam to produce a signal indicative of strains suffered by the beam. According to the invention both the beam and the membrane are formed as one element, with the part forming the beam having a thickness substantially greater than the part forming the membrane. The beam portion extends between two oppositely lying peripheral zones of the membrane, and comprises grooves. The bottom portions of the grooves constitute strain concentration zones in the vicinity of which the strain gauges are affixed. Preferably, the grooves are configured in two pairs, each pair being mutually symmetrical about the center of said beam.

3 Claims, 3 Drawing Sheets

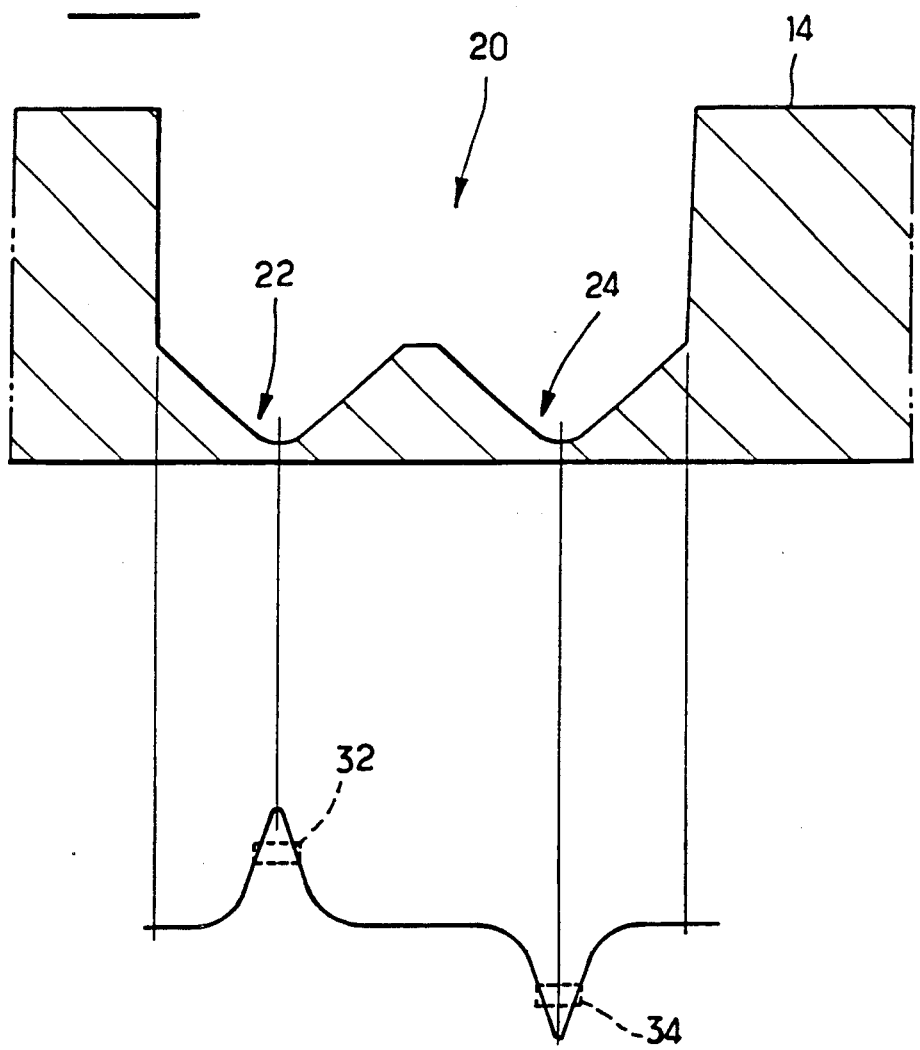

STRAIN-CONCENTRATING, MEMBRANE-TYPE TRANSDUCER

BACKGROUND OF THE INVENTION

1. Field of the Invention

The present invention relates to transducers, and more particularly to a strain-concentrating, membrane-type transducer.

2. Prior Art

For the measurement of relatively high pressures, it is known in the prior art to use high-pressure transducers that essentially comprise a pressure-sensitive deformable membrane equipped with strain gauges, such as described in patent documents FR-A-2 587 485, FR-A-2 594 224 and FR-A-2 594 546, for instance. The strain gauges affixed to the membrane can be four in number, connected in a bridge configuration.

The membrane can have a more or less complex shape, going from a simple flat membrane to a membrane having a central reinforcement. FIG. 1, for instance, shows a membrane 1 having a peripheral edge section 2 and a central reinforcement 3 so as to define an annular channel 4 in which the strains are contained.

Such a transducer is ill-suited for the measurement of low pressures, e.g. less than 20 bars. Indeed, the membrane, which is normally made of steel, cannot reasonably be less than 0.1 mm thick in the channel portions 4. At such low values, the inevitable thickness dispersions in manufacture give rise to a relatively uncertainty in the transducer's sensitivity, and a correspondingly high error margin in the measurements. Moreover, the membranes tend to be unstable and are prone to inelastic deformations at certain points.

It has also been proposed to measure low pressures using transducers such as illustrated in FIG. 2, where a soft membrane 5 is joined to a beam 6 that detects stresses transmitted by the membrane and on which are affixed a number of strain gauges 7. The membrane is made of thin steel for the maximum flexibility, in order to transmit practically all the stress developed to the beam 6.

The above low-pressure transducers are thus comprised of two fairly complex sub-assemblies, giving rise to inconsistencies in assembly, to the detriment of transducer performance.

SUMMARY OF THE INVENTION WITH OBJECTS

It is an object of the present invention to provide a transducer, and more particularly a transducer of the type comprising a membrane that is deformable under the effect of a magnitude to be measured, enabling precise and reliable measurement of relatively low amplitude magnitudes, and capable of a linear response while possessing a simple structure.

This object is achieved by means of a transducer comprising a membrane that is deformable under the effect of a magnitude to be measured, a beam joined to said membrane to detect stresses transmitted by said membrane, and strain gauges affixed to said beam to produce a signal indicative of strains suffered by said beam, wherein, according to the invention, said membrane and said beam are formed as one element in which a part forming said beam has a thickness substantially greater than a part forming said membrane and extends between two oppositely lying peripheral zones of said membrane; and said beam comprises grooves whereby bottom portions thereof constitute strain concentration zones in the vicinity of which said strain gauges are affixed.

The manufacture of the membrane and beam as a one-piece structure provides a very simple solution to the problems of assembling the sensitive transducer elements.

The presence of grooves in the beam serves to define strain-concentration zones of very small dimensions. Accordingly, the beam can be made sufficiently stiff so as not to droop, such droop being a chief cause of non-linearity in the measuring system.

Preferably, the channels are disposed in two pairs that are symmetrically located with respect to each other about the center of the beam.

At the bottom of the two grooves of each pair are formed two strain concentration zones, one working in traction, the other in compression, and the strain gauges in the vicinity of these zones form a bridge network.

BRIEF DESCRIPTION OF THE DRAWINGS

Other features and advantages of the present invention shall become apparent from the following description of preferred embodiments, given by way of example only, with reference to the appended drawings in which;

FIG. 6 is a cross-sectional view on an enlarged scale showing the double-channel profile of a depressed portion of the beam of the transducer shown in FIG. 3;

FIG. 7 shows an amplitude variation of the strains along a depressed portion of the beam of the sensitive element of FIG. 3;

DESCRIPTION OF THE PREFERRED EMBODIMENTS

Figure 1:
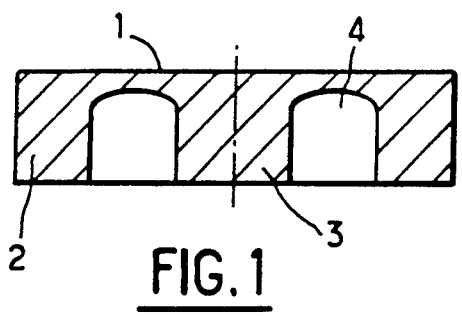
FIGS. 1 and 2, already described hereabove, depict sensitive elements of prior art pressure transducers.
Figure 2:
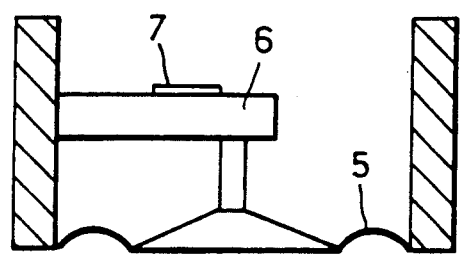
Figure 3:
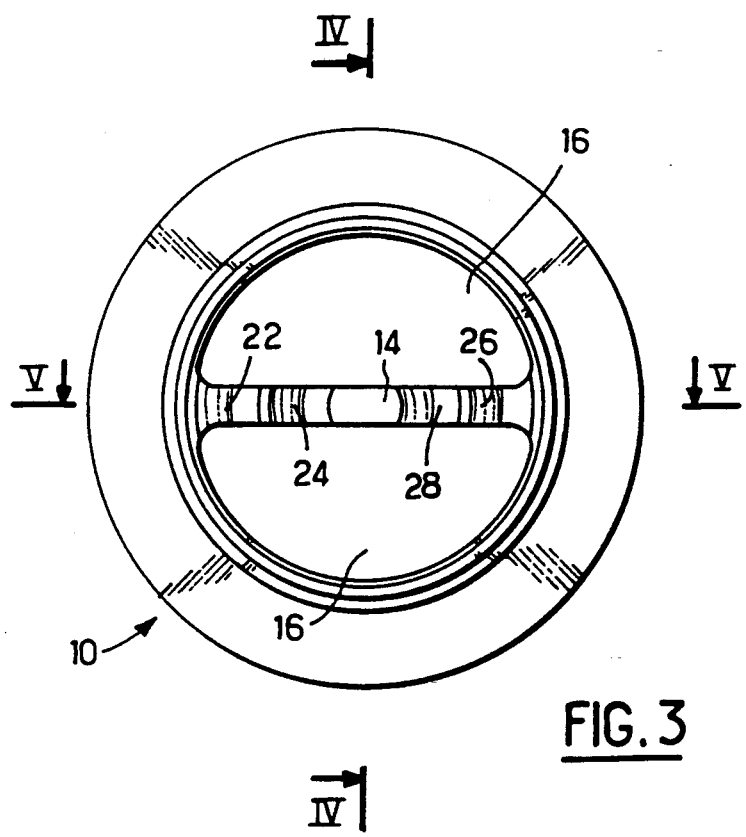
FIG. 3 is a plan view of a sensitive element of the pressure transducer according to a first embodiment of the present invention.
Figure 4:
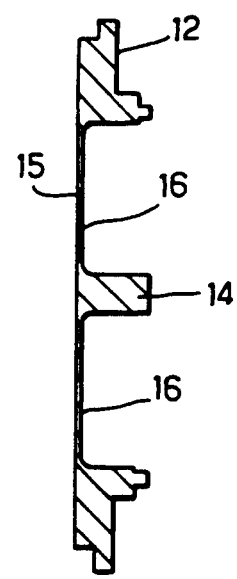
FIGS. 4 and 5 are cross-sectional views along planes IV—IV and V—V of FIG. 3.
Figure 5:
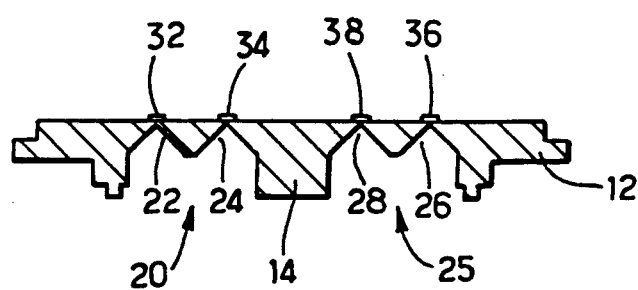
Figure 8:
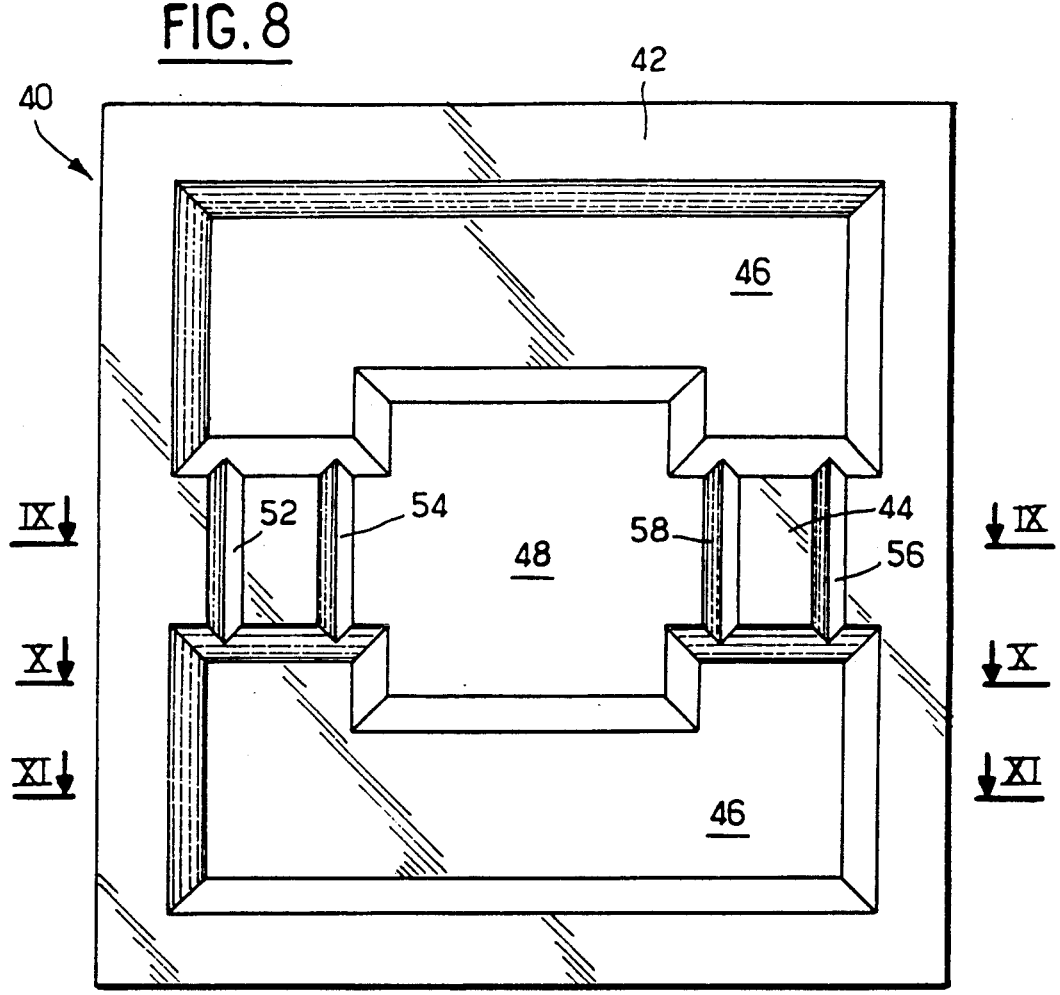
FIG. 8 is a plan view of a sensitive element according to a second embodiment of the transducer according to the present invention.
Figure 9:
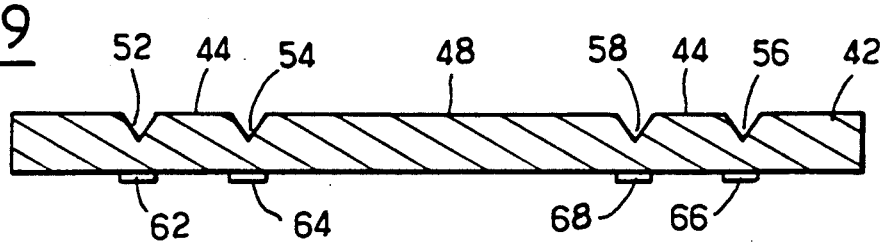
FIGS. 9 to 11 are cross-sectional views along planes IX—IX, X—X and XI—XI of FIG. 8.
Figure 10:
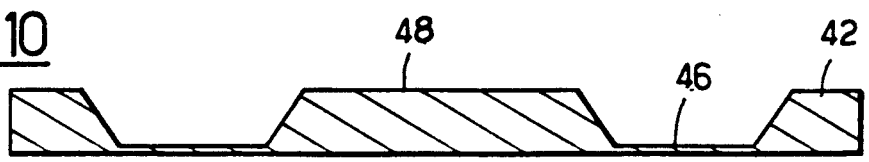
Figure 11:
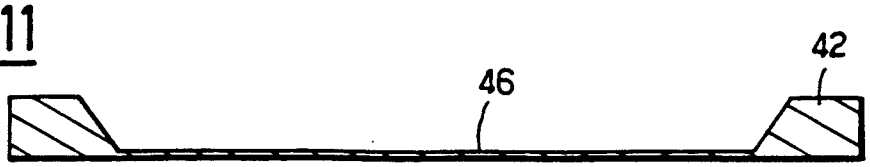

An embodiment of the sensitive element of a transducer according to the invention is illustrated in FIGS. 3 to 5.

This element has the shape of a disk 10 and is made as a single element comprising an annular peripheral portion 12 forming an edge whereby the sensitive element is lodged in the body of the transducer, e.g. a pressure transducer, a beam-shaped thick portion 14 extending diametrically between two opposite regions of the peripheral edge 12 at one side of the disk 10, and a thin portion forming a membrane 16. The membrane is in fact comprised of two substantially semi-circular halves on either side of the beam 14, and delimited by the latter and by the peripheral edge 12.

The sensitive element 10 is made of steel and produced by machining. By way of illustration, the thickness of the membrane is less than 0.3 mm, e.g. approximately equal to 0.15 mm, while the thickness of the beam can be in excess of 2 mm, e.g. approximately equal to 3 mm.

The beam 14 has two depressed portions 20, 25 formed on its front face 15. The depressed portions 20, 25 are mutually symmetrical about the center of the beam 14. Each extends perpendicularly to the longitudinal direction of the beam, throughout the width of the latter, and is terminated by two channels 22,24 and 26,28, respectively, located side-by-side along the width of the beam. Each channel has at least its bottom portion defining a V-shaped profile, thus giving a generally W-shaped profile to each depressed portion. One of the depressed portions (20) is illustrated in more detail in FIG. 6. By way of indication, the thickness of the thinnest part of beam 14, at the center of each channel 22, 24, 26, 28 can be less than 0.3 mm, e.g. approximately equal to 0.2 mm. Strain gauges 32, 34, 36, 38 are located in the region at the bottom of channels 22, 24, 26 and 28 respectively and are affixed to the surface of the disk 10 opposite to the surface where the beam 14 is located.

When the sensitive element 10 is lodged in the transducer body, a pressure exerted on the element from the side where the beam 14 is located causes the membrane 16 to distort, so inducing stresses on the beam 14. These stresses on the beam 14 are concentrated at its thinnest regions, i.e, at the bottom of the channels 22, 24, 26, 28. The bottom portions of channels 22, 26 lying closest to the ends of the beams 14 are submitted to tractive forces, while the bottom portions of channels 24, 28 lying closest to the center of the beam are submitted to compressive forces, as illustrated in FIG. 7. The strain gauges are positioned so as to be located at the stress maxima, as shown by the dashed lines in FIG. 7.

Advantageously, the strain gauges are made by a known thin-film technology so as to achieve small dimensions.

The strain gauges 32, 34, 36, 38 are connected to form a bridge network, in a manner known in the art.

The above-described structure makes it possible to achieve a substantially linear response throughout a wide range of values. Indeed, the considerable strain concentration produced by the channels formed in the beam allows the latter to be kept sufficiently rigid so as not to impose a large distortion in the membrane, which would otherwise introduce non-linearity.

FIGS. 8 to 11 illustrate a second embodiment of a sensitive element 40 for a transducer according to the present invention.

The sensitive element 40 has a generally square shape with a peripheral portion 42 defining an edge for lodging the sensitive element in the transducer body, a thick median portion defining a beam 44 and extending between two opposite sides of the edge 42, and a thin portion forming a membrane 46. The beam has a widened middle portion forming a thrust surface 48. The membrane is in fact comprised of two parts located on either side of the beam 44 and delimited by edge 42.

A series of notches 52, 54, 56 and 58 are formed in the beam 44. Notches 52,54 from one pair disposed symmetrically with respect to another pair of notches 56, 58 about the center of the beam. The notches are formed in the narrowest portions of the beam 44, i.e. between the thrust surface 48 and the ends of the beam. As can be seen from FIG 9, each notch defines a V-groove and extends transversally relative to the length of the beam and throughout the width of the latter. Strain gauges 62, 64, 66 and 68 forming a bridge network are placed in the region of the bottom of the notches 52, 54, 56 and 58, respectively, on the side of the sensitive element 40 opposite to where the beam is located.

As in the first embodiment, the notches 52, 54, 56 and 58 define strain concentration zones where the thinned portions of the beam are subjected to tractive or compressive forces. The thrust surface constitutes towards improving stress transmission from the membrane 46 to the beam 44. Also, as in the previous embodiment, the provision of notches ensures a strain concentration such that the beam can be relatively rigid, so reducing the droop imposed on the membrane, and thereby granting a more linear response.

The sensitive element 40, which is comprised of the edge portion 42, the beam 44, the membrane 46 and the thrust surface 48 is made as a single component, e.g. from silicon. In this case, the thinned portions forming the membrane can be obtained by chemical etching of material, using a process commonly employed in the field of semiconductor technology.

Although the above-described embodiments relate to pressure transducers, the present invention is not limited to pressure measurements, being applicable to the measurement of other magnitudes susceptible of causing a distortion of the sensitive element such as acceleration.

Moreover, the sensitive element need not necessarily be made generally circular or square; it can e.g. have a polygonal shape having at least one symmetry axis along which the beam can lie.

What is claimed is:

1. A transducer comprising:
    a membrane which is deformable under the effect of a magnitude to be measured;
    a beam detecting stresses transmitted by said membrane, said beam and said membrane being formed as a unitary element in which a part forming said beam has a thickness substantially greater than a part forming said membrane and extends between two oppositely lying peripheral zones of said membrane;
    a first pair and a second pair of strain gauges producing signals indicative of strains suffered by said beam, said first pair and said second pair of strain gauges being affixed onto one face of said beam at locations of strain concentration zones created at bottoms of a plurality of V-shaped grooves formed in said beam opposite said one face; and
    a first strain gauge and a second strain gauge comprising each of said first pair and said second pair of strain gauges, said first strain gauge underlying tensile forces and said second strain gauge underlying compressive forces, said first strain gauge and said second strain gauge each being located at an apex of a respective one of said plurality of V-shaped grooves and said plurality of V-shaped grooves being located in pairs forming substantially W-shaped depressed portions in said beam, wherein each of said first pair and said second pair of strain gauges corresponds with a respective one of said substantially W-shaped depressed portions.

2. The transducer of claim 1 wherein said first pair of strain gauges are located symmetrically to said second pair of strain gauges with respect to a middle of said beam.

3. The transducer of claim 1 wherein said membrane and said beam are made from a single piece of silicon.

* * * * *